(12) United States Patent
Picard

(10) Patent No.: US 12,460,560 B2
(45) Date of Patent: Nov. 4, 2025

(54) OIL JET FOR A TURBINE ENGINE

(71) Applicant: SAFRAN AIRCRAFT ENGINES, Paris (FR)

(72) Inventor: Mathieu Picard, Moissy Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 18/256,816

(22) PCT Filed: Dec. 6, 2021

(86) PCT No.: PCT/FR2021/052215
§ 371 (c)(1),
(2) Date: Jun. 9, 2023

(87) PCT Pub. No.: WO2022/123160
PCT Pub. Date: Jun. 16, 2022

(65) Prior Publication Data
US 2024/0093618 A1    Mar. 21, 2024

(30) Foreign Application Priority Data

Dec. 10, 2020 (FR) ..................................... 2012963

(51) Int. Cl.
*F01D 25/18* (2006.01)
*F16C 33/66* (2006.01)
*F16N 21/00* (2006.01)

(52) U.S. Cl.
CPC .......... *F01D 25/18* (2013.01); *F16C 33/6659* (2013.01); *F16N 21/00* (2013.01);
(Continued)

(58) Field of Classification Search
None
See application file for complete search history.

(56) References Cited

U.S. PATENT DOCUMENTS

| 2,531,411 A | 11/1950 | Davenport |
| 7,004,189 B2 * | 2/2006 | Heurtel ................... F01D 25/18 |
| | | 137/71 |

(Continued)

FOREIGN PATENT DOCUMENTS

| CN | 106194433 A | 12/2016 |
| EP | 2 402 622 A1 | 1/2012 |
| EP | 693 651 A1 | 8/2020 |

OTHER PUBLICATIONS

International Search Report as issued in International Patent Application No. PCT/FR2021/052215, dated Apr. 5, 2022.

*Primary Examiner* — Juan G Flores
(74) *Attorney, Agent, or Firm* — Pillsbury Winthrop Shaw Pittman LLP

(57) ABSTRACT

An oil jet for lubricating members such as bearings inside a turbine engine, includes a main pipe for supplying oil, at least one secondary oil discharge pipe through which the oil is sprayed onto the member, and a connection area which is for connecting the secondary pipe to the main pipe and which includes a junction angle between the main pipe and the secondary pipe, wherein the connection area includes an inner wall in contact with the oil, the inner wall being at least partially curved at the junction between the secondary pipe and the main pipe such that the junction angle inside the connection area is at least partially rounded.

9 Claims, 2 Drawing Sheets

(52) U.S. Cl.
CPC ...... *F05D 2240/50* (2013.01); *F05D 2260/98* (2013.01); *F16C 2360/23* (2013.01)

(56) References Cited

U.S. PATENT DOCUMENTS

| | | | |
|---|---|---|---|
| 7,384,197 B2 * | 6/2008 | Plona | ............... F16C 33/58 384/473 |
| 11,230,946 B2 * | 1/2022 | Davis | ............... F01M 1/08 |
| 2002/0157704 A1 * | 10/2002 | Heurtel | ............... F16C 33/6659 137/71 |
| 2006/0159378 A1 * | 7/2006 | Plona | ............... F16C 33/58 384/462 |
| 2009/0218170 A1 | 9/2009 | Hoffmann et al. | |
| 2020/0256211 A1 * | 8/2020 | Davis | ............... F01M 1/08 |

\* cited by examiner

OIL JET FOR A TURBINE ENGINE

CROSS-REFERENCE TO RELATED APPLICATIONS

This application is the U.S. National Stage of PCT/FR2021/052215, filed Dec. 6, 2021, which in turn claims priority to French patent application number 2012963 filed Dec. 10, 2020. The content of these applications are incorporated herein by reference in their entirety.

TECHNICAL FIELD OF THE INVENTION

The present invention relates to an oil nozzle for a turbomachine and especially an oil nozzle for spraying oil to lubricate and/or cool members such as the bearings of a turbomachine. It also relates to a turbomachine equipped with at least one such oil nozzle.

The invention finds applications in the field of aeronautics and, in particular, in the field of lubrication of aeronautical engine parts such as turbomachine bearings.

TECHNOLOGICAL BACKGROUND OF THE INVENTION

It is known, in aeronautics, to spray oil onto some parts of turbomachines in order to lubricate and/or cool them. In particular, in a turbomachine, members such as bearings, gears, electric generators, etc., are lubricated by means of an oil circulating in an oil circuit and injected by an oil nozzle towards the members to be lubricated, in an engine casing.

One example of an engine casing of a turbomachine is represented in FIG. 1. This FIG. 1 shows an engine shaft 10 about which bearings 20 are mounted, providing mechanical connection between the rotor and the stator of the engine. A first casing 30 surrounds the bearings 20 and ensures oil circulation. A second casing 40 surrounds the first casing and ensures pressurisation of oil within the first casing 30. In this example, oil is sprayed towards the bearings 20, within the first casing 30, by an oil nozzle, schematically represented by reference 100. Oil thus sprayed onto the bearings trickles into the first casing 30 and drains by gravity into the collection duct 35 to be recycled and/or re-injected into the oil circuit.

To be effective, members, for example bearings, should be lubricated homogeneously with an oil distributed as evenly as possible on said members. However, the behaviour of the oil jet sprayed onto the engine members to be lubricated varies according to the flight phases of the aircraft. Indeed, during flight, the turbomachine shaft rotates at speeds that vary according to the flight phase. When the speed of rotation of the shaft is high, the rotational movement of the shaft induces air flows that can have an effect on the behaviour of the oil jet injected, such as deflecting the oil jet. Yet, deflecting the oil jet results in less precise and less dynamic targeting. The oil jet may not reach the targeted member or may only reach part of the member to be lubricated, which has a direct effect on the operation of the engine and the lifetime of the member.

In the field of aeronautics, oil nozzles are often formed by a duct or a set of ducts made by drilling bores in a blank. One example of an oil nozzle is represented in a cross-section view in FIG. 2. In this example, the oil nozzle includes a main duct 110, for example a portion of an oil circuit, and a secondary duct 120 connected to the main duct. The secondary duct 120, having length L and diameter D, includes a first end 120a connected to the main duct and a second, open end 120b, through which the oil, under the effect of pressure, is sprayed towards the member to be lubricated.

As current jets are manufactured using multiple bores, salient angles are created in the duct connection zones, forming sharp edges between two bores, at the intersection of the ducts. These edges cause instability in the oil stream. For example, in the connection zones, the oil flow can produce detachment, which causes a low-pressure zone that can generate cavitation and/or destabilise the oil jet by amplifying disparities in the oil flow. The oil flow is thereby no longer symmetrical, which can cause atomisation of the oil jet, that is the jet bursts into a diffuse spray.

FIG. 3 represents a diagram showing an example of pressure differences within a conventional oil nozzle. In this example, the oil flow circulates in the main duct 110 with a pressure P1 and then enters the secondary duct 120 with a pressure that changes within said secondary duct. The pressure P1 at the inlet of the secondary duct 120, especially in the top part of the connection zone 130, changes towards a pressure P2 in the vicinity of the lower part of the connection zone 130. This pressure difference between the different portions of the secondary duct 120 generates, in this example, a vortex shedding LT (having a pressure P3) and a depression zone DP (having a pressure P4) in said secondary duct. The oil flow in the secondary duct 120 is therefore unstable and this instability is reflected throughout the oil flow, even after it leaves said secondary duct. Indeed, the oil jet, after the outlet 140 of the nozzle 100, includes pressure variations VP which induce poor quality of the oil jet, such as a diffuse spray burst, called atomisation. Yet, an atomised oil jet is not only non-coherent and therefore of poor quality, but it is also particularly sensitive to air flows and can therefore be easily deflected, resulting in poor targeting of the members to be lubricated.

It is known, in the field of aeronautics, to attempt to remedy problems of instability of the oil flow and atomisation of said oil jet at the nozzle outlet, by increasing the L/D ratio of the oil nozzle because, the greater the L/D ratio, the more time the oil flow has to stabilise before leaving the nozzle. However, increasing the L/D ratio has a direct impact on dimensioning the nozzle, which thereby has a higher overall size.

But, nowadays, the environment within turbomachines is increasingly restricted, which makes it necessary to reduce the overall size of the different parts and members within turbomachines and, in particular, the overall size of the nozzles. Solutions provided to date are therefore contrary to the current change in turbomachines.

There is therefore a real need for an oil nozzle enabling a stable oil jet to be sprayed, that is an oil jet which, when sprayed towards the members to be lubricated, is free from any depression and/or imbalance, without the overall size of the jet being increased.

SUMMARY OF THE INVENTION

In order to respond to the problems discussed above of instability of the oil jet at the nozzle outlet, the applicant provides an oil nozzle for lubricating turbomachine members, the inner wall of the connection zone of which is curved and free from angular portions.

According to a first aspect, the invention relates to an oil nozzle for lubricating members such as bearings within a turbomachine, comprising:

a main oil supply duct, at least one secondary oil outlet duct through which oil is sprayed onto the member, and a connection zone for connecting the secondary duct to the main duct, including a junction angle between the main duct and the secondary duct, characterised in that the connection zone includes an inner wall in contact with oil, said inner wall being at least partially curved at the junction between the secondary duct and the main duct so that the junction angle inside the connection zone is at least partially rounded.

Due to the absence of angular portion at the junction between the main duct and the secondary duct, this nozzle allows a smooth circulation of the oil flow, which reduces the risks of unsteady oil flow phenomena in the secondary duct and ensures coherent oil jet at the nozzle outlet.

The term inner wall, as opposed to outer wall, refers to a wall located internally to the ducts and therefore in contact with oil circulating in the oil nozzle.

Further to the characteristics just discussed in the preceding paragraph, the oil nozzle according to one aspect of the invention may have one or more additional characteristics from among the following, considered individually or according to any technically possible combinations:

The inner wall in contact with the oil includes a bulge extending over at least one portion of the circumference of the junction angle between the secondary duct and the main duct.

The inner wall includes a shape determined as a function of a diameter of the secondary duct, of a value of the junction angle between the main duct and the secondary duct and/or of a ratio L/D, where D is the diameter of the secondary duct and L is its length.

The junction angle between the main duct and the secondary duct is, in the direction of oil flow, an obtuse angle.

The curved shape of the inner wall is obtained by additive manufacturing.

The curved shape of the inner wall is obtained by adding an annular part attached inside the connection zone.

The curved shape of the inner wall is obtained by drilling a blank.

The secondary duct and/or the main duct is made of a flexible material able to adapt to the oil flow circulating in said ducts, the main and/or secondary duct made of flexible material being held by an attachment system on a structure of the turbomachine.

Another aspect of the invention relates to a turbomachine, characterised in that it includes at least one oil nozzle as defined above.

BRIEF DESCRIPTION OF THE FIGURES

Further advantages and characteristics of the invention will become apparent from the following description, illustrated by the figures in which.

DETAILED DESCRIPTION

An exemplary embodiment of an oil nozzle, configured to limit instability of the oil flow in the secondary duct of the nozzle, is described in detail below, with reference to the appended drawings. This example illustrates characteristics and advantages of the invention. However, it is reminded that the invention is not limited to this example.

In the figures, identical elements are marked with identical references. For reasons of legibility of the figures, the size scales between the elements represented are not respected.

Figure 1:
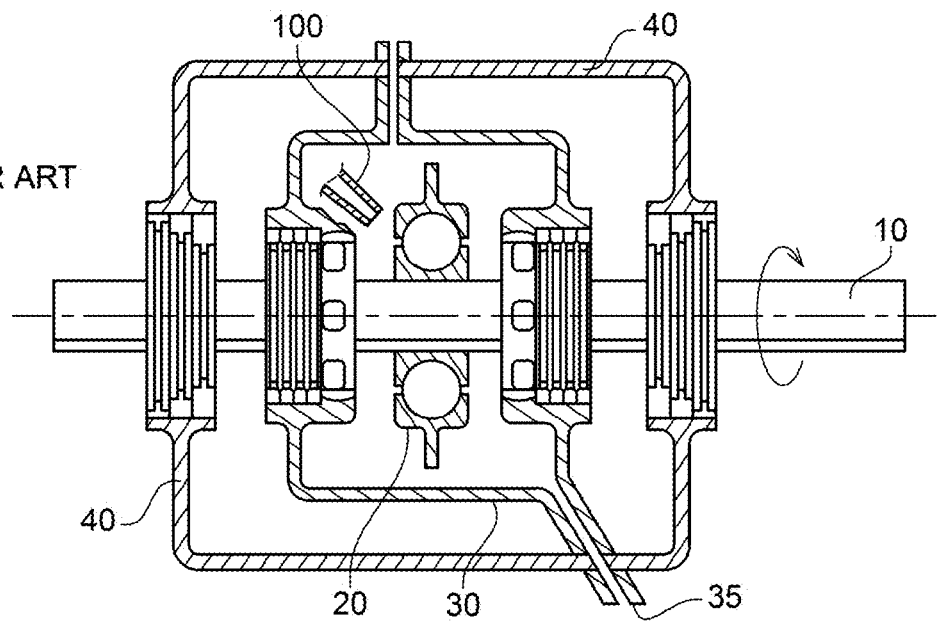
FIG. 1, already described, represents a schematic cross-section view of an example of a turbomachine engine casing equipped with an oil nozzle.
Figure 2:
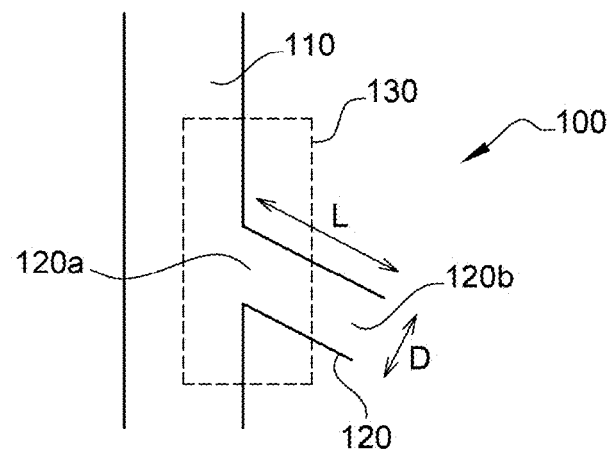
FIG. 2, already described, represents a schematic cross-section view of an oil nozzle according to the state of the art.
Figure 3:
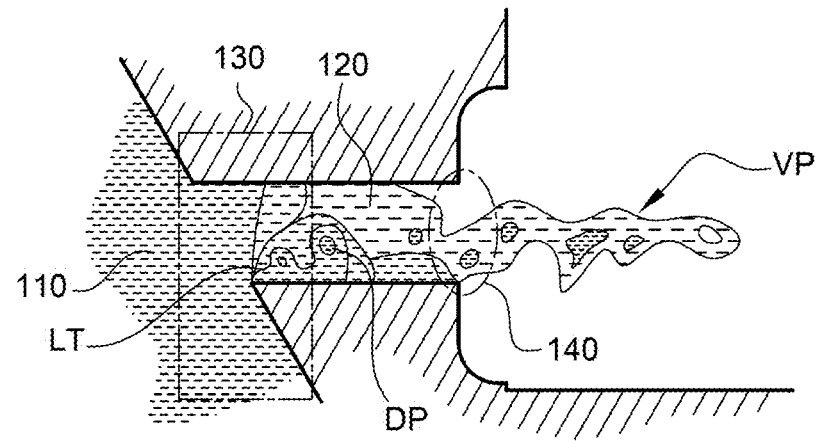
FIG. 3, already described, schematically represents a variation in the pressure of the oil flow within a nozzle according to the state of the art and at the outlet of said nozzle.
Figure 4:
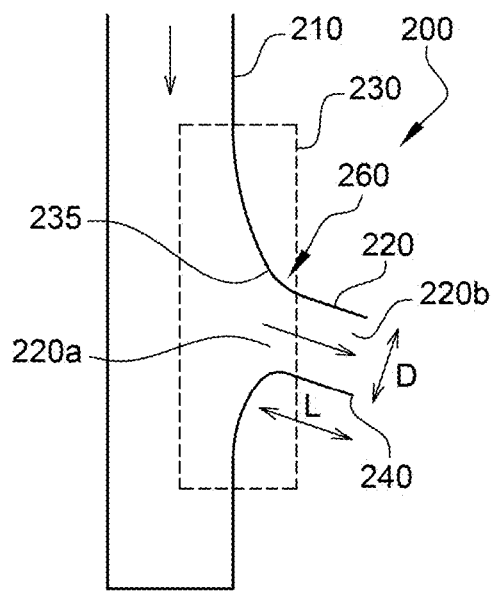
FIG. 4 represents a schematic cross-section view of an example of an oil nozzle according to the invention.

One example of an oil nozzle according to the invention is represented in FIG. 4. This oil nozzle 200 includes a main duct 210, for example a portion of an oil circuit, and a secondary duct 220 connected to the main duct 210 in a region called the connection zone 230. The main duct 210 and the secondary duct 220 are pipings arranged to transport oil from the oil circuit to the outlet 240 of the nozzle 200 from where it is sprayed towards the members to be lubricated. The secondary duct 220 includes a first end 220a connected to the main duct 210 and a second, open end 220b, through which oil, under the effect of pressure, is sprayed towards the member to be lubricated, for example a bearing. At the junction between the secondary duct and the main duct, that is at the mouth of the secondary duct, the connection zone 230 includes an angle, called the junction angle. This angle is preferably, along the oil circulation direction, an obtuse angle adapted to ensure oil circulation at a chosen pressure.

The oil nozzle according to the invention includes, in the connection zone 230 where the secondary duct 220 is connected to the main duct 210, a curved inner wall 235, forming a rounded portion over at least one portion of the junction angle, internally to the connection zone 230. Indeed, as represented in FIG. 4, the inner wall 235 has a curve of a predefined shape, adapted to limit or eliminate sharp edges or angular protrusions internally to the connection zone 230, in the vicinity of the junction angle.

According to some embodiments of the invention, the inner wall 235 has a curved shape extending about the entire circumference of the junction angle between the secondary duct 220 and the main duct 210 so that the entire junction angle is rounded. In these embodiments, the junction angle no longer includes any angular protrusion or sharp edge that could generate instability in the oil flow.

According to other embodiments, the inner wall 235 has a curved shape extending over only part of the circumference of the junction angle between the secondary duct 220 and the main duct 210. In these embodiments, the curved part of the junction angle extends over the part of the junction angle having the greatest impact on the pressure of the oil when it enters the secondary duct and therefore the greatest risk of generating disturbances in the circulation of the oil flow. Thus, by limiting the angular protrusions to the zones of the junction angle least prone to creating disturbances, the risks of instability in the oil stream are limited.

According to some embodiments, the inner wall 235 includes a bulge extending over the entire circumference of the junction between the secondary duct and the main duct or over only part of this circumference. This bulge, which can be obtained by various methods subsequently described, has the effect of covering a salient angle so that the oil is no longer in contact with said salient angle but with the bulge. These embodiments have the advantage of enabling the main and secondary ducts to be manufactured using the conventional drilling technique, the addition of the bulge being an operation carried out subsequently on existing ducts.

In some embodiments of the invention, the outer wall of the connection zone 230, that is the wall which is not in contact with oil, may also be curved with a shape identical to or different from the shape of the inner wall 235.

The fact that at least part of the junction angle between the main duct 210 and the secondary duct 220 is rounded, and therefore free of sharp edge or angular protrusion, facilitates the flow of oil within the nozzle, which makes it possible to avoid detachment and limit unsteady phenomena in the oil stream in the secondary duct 220.

Like any nozzle, the secondary duct 220 of the oil nozzle 200 includes a length L and a diameter D. The detail of the curved shape of the inner wall 235, for example its curvature, can be determined as a function of the value of the junction angle, of the diameter D of the secondary duct 220, of the L/D ratio, etc. For example, the radius of curvature of the inner wall 235 will be smaller for a 90° junction angle than for a 120° junction angle. An optimum shape of the inner wall 235 can be determined by topological optimisation using simulation tools, for example of the CFD (Computational Fluid Dynamics) type, or by testing a range of technological solutions. An optimal shape of the inner wall 235 can result in a minimum length L of the secondary duct 220 and, consequently, a minimum lateral overall size of the oil nozzle.

The curved or rounded shape of the inner wall 235 can be obtained by different manufacturing methods. It can, for example, be obtained by additive manufacturing, by depositing one or more layers of material over and/or about the junction angle, inside the connection zone 230. Such a technique by additive manufacturing makes it possible, for example, to produce a bulge or a particular shape of the connection zone.

Figure 5:
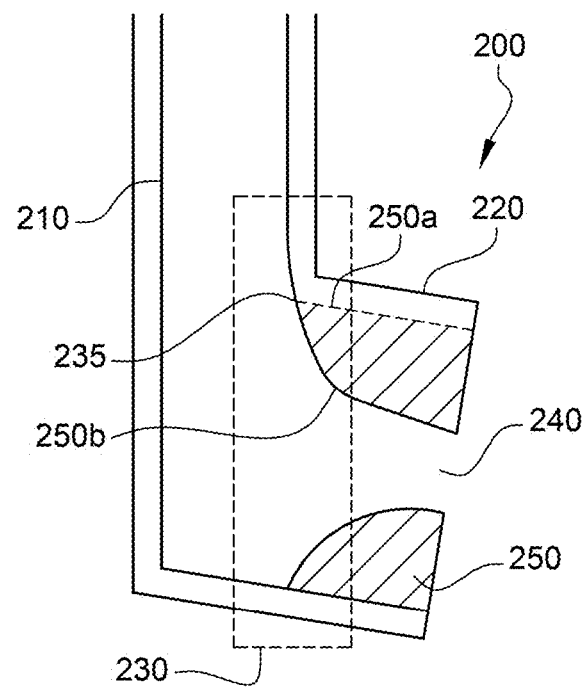
FIG. 5 represents a schematic cross-section view of another example of an oil nozzle according to the invention.
Figure 6:
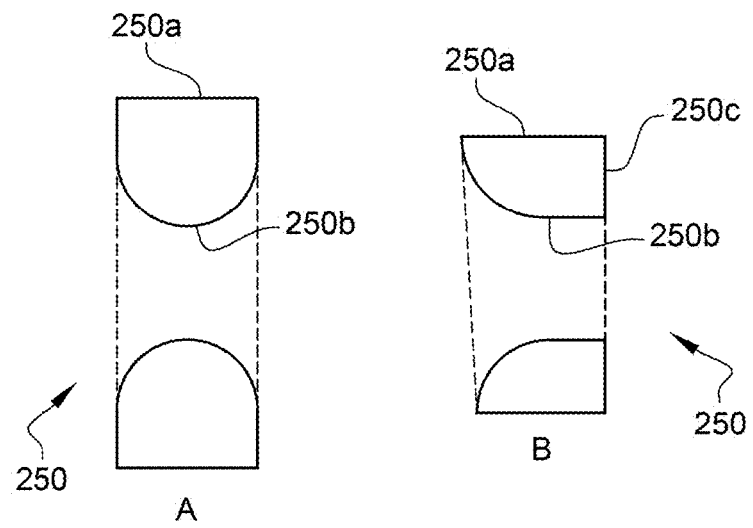
FIG. 6 represents, in a schematic cross-section view, two examples of annular parts to be attached in the connection zone of an oil nozzle according to the invention.

According to another alternative, the curved shape of the inner wall 235 can be obtained by adding a specific part inside the nozzle, in the connection zone 230. An example of a nozzle 200 equipped with such a specific part 250 is schematically represented in FIG. 5. This specific part 250 may be an annular part, or channel, housed in the secondary duct 220, at the intersection with the main duct 210, at the place of the junction angle. This annular part 250 may be in the form of a ring, as in example A in FIG. 6, including a planar outer face 250a, arranged to be in contact with the inner face 220b of the secondary duct 220, and a domed inner face 250b, arranged to be in contact with the oil stream. Alternatively, the annular part 250 may be in the form of a half-ring, as in example B in FIG. 6, including a planar outer face 250a, arranged to be in contact with the inner face 220b of the secondary duct 220, a domed inner face 250b, arranged to be in contact with the oil stream, and a planar transverse face 250c forming the outlet face of the nozzle. This annular part may be attached internally to the connection zone 230 by any attachment means known in the art, such as welding, soldering, brazing or screwing.

According to one embodiment of the invention, the secondary duct 220 and/or the main duct 210 is made of a flexible material able to adapt to the oil stream circulating in said ducts and having good heat resistance. The flexible material has the advantage of having a curved junction, without any angular portion. In this embodiment, the duct(s) made of flexible material is held by a fastener system mounted to a surrounding structure, such as a crankcase of the engine casing.

Whatever the embodiment of the nozzle according to the invention, the smoother the oil flow at the places where there are changes of direction, that is in the connection zone 230, without any roughness or angular portion, the more the risks of separation and disturbances are reduced, which ensures a stable flow of the oil stream in the secondary duct 220 and therefore a coherent jet at the nozzle outlet 240. As a result, atomisation and/or poor targeting are considerably reduced or even eliminated. The secondary duct 220 of the oil nozzle according to the invention can therefore have a shorter length L than in conventional nozzles since this length is no longer needed to stabilise the oil stream before it leaves the nozzle.

Although described through a number of examples, alternatives and embodiments, the oil nozzle according to the invention comprises various alternatives, modifications and improvements which will be obvious to the person skilled in the art, it being understood that these alternatives, modifications and improvements are within the scope of the invention.

The invention claimed is:

1. An oil nozzle for lubricating a member within a turbomachine, comprising:
   a main oil supply duct comprising multiple bores, each one forming a duct connection zone,
   secondary oil outlet ducts through which oil is sprayed onto the member, and
   the duct connection zones for connecting the secondary oil outlet ducts to the main oil supply duct, each duct connection zone including a junction angle between the main oil supply duct and one of the secondary oil outlet ducts,
wherein each duct connection zone includes an inner wall in contact with oil, said inner wall being at least partially curved at the junction between one of the secondary oil outlet ducts and the main oil supply duct so that the junction angle inside the duct connection zone is at least partially rounded, said inner wall including a bulge extending over at least one portion of a circumference of the junction angle between the one secondary oil outlet duct and the main oil supply duct and covering a salient angle of said junction angle.

2. The oil nozzle according to claim 1, wherein the inner wall includes a shape determined as a function of a diameter of the one secondary oil outlet duct, of a value of the junction angle between the main oil supply duct and the one secondary oil outlet duct and/or of a ratio L/D, where D is the diameter of the one secondary oil outlet duct and L is a length of the one secondary oil outlet duct.

3. The oil nozzle according to claim 1, wherein the junction angle between the main oil supply duct and the one secondary oil outlet duct is, along an oil flow direction, an obtuse angle.

4. The oil nozzle according to claim 1, wherein a curved shape of the inner wall is obtained by additive manufacturing.

5. The oil nozzle according to claim 1, wherein a curved shape of the inner wall is obtained by adding an annular part attached inside the connection zone.

6. The oil nozzle according to claim 1, wherein a curved shape of the inner wall is obtained by drilling a blank.

7. The oil nozzle according to claim 1, wherein the member is a bearing.

8. The oil nozzle according to claim 1, wherein the main oil supply duct is part of an oil circuit, and wherein each secondary oil outlet duct includes a first end connected to the main oil supply duct and a second, open end through which oil is sprayed.

9. A turbomachine, comprising at least one oil nozzle according to claim 1.

* * * * *